(12) United States Patent
Bader et al.

(10) Patent No.: US 7,849,759 B2
(45) Date of Patent: Dec. 14, 2010

(54) SHIFTING DEVICE FOR A TRANSMISSION

(75) Inventors: Josef Bader, Friedrichshafen (DE);
Stefan Renner, Bodmann-Ludwigshafen (DE); Karlheinz Mayr, Bregenz (AT);
Reiner Keller, Bodmann-Ludwigshafen (DE); Kai Heinrich, Waldburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 822 days.

(21) Appl. No.: 11/813,912

(22) PCT Filed: Dec. 2, 2005

(86) PCT No.: PCT/EP2005/012915

§ 371 (c)(1),
(2), (4) Date: Jul. 13, 2007

(87) PCT Pub. No.: WO2006/074759

PCT Pub. Date: Jul. 20, 2006

(65) Prior Publication Data

US 2010/0043584 A1     Feb. 25, 2010

(30) Foreign Application Priority Data

Jan. 13, 2005  (DE) .................. 10 2005 001 551

(51) Int. Cl.
*G05G 5/00* (2006.01)
*G05G 5/08* (2006.01)

(52) U.S. Cl. .................. 74/473.21; 74/473.25
(58) Field of Classification Search ............. 74/473.21, 74/473.24, 473.25, 473.36, 473.37, 473.1, 74/89.14, 425, 473.3, 473.33
See application file for complete search history.

(56) References Cited

U.S. PATENT DOCUMENTS

| 5,357,821 A | 10/1994 | Haka et al. |
| 5,996,436 A | 12/1999 | Dreier et al. |
| 6,691,590 B1 | 2/2004 | Patzner et al. |

FOREIGN PATENT DOCUMENTS

| DE | 1 286 859 | 1/1969 |
| DE | 30 12 764 A1 | 10/1981 |
| DE | 43 35 754 A1 | 4/1995 |
| DE | 199 01 055 A1 | 8/1999 |
| DE | 199 51 683 A1 | 5/2001 |
| EP | 0 916 875 A2 | 5/1999 |
| EP | 1 486 704 A1 | 12/2004 |
| FR | 2 659 410 | 9/1991 |

*Primary Examiner*—Thomas R Hannon
*Assistant Examiner*—Phillip A Johnson
(74) *Attorney, Agent, or Firm*—Davis & Bujold, P.L.L.C.

(57) ABSTRACT

A shifting device (1) for a transmission with a selection actuator and a shifting actuator, which a shifting shaft (2) comprising shifting forks (3) or selector forks, which engage in sliding collars for engaging the gears in which the shifting motion can be carried out by way of an axial motion of the shifting shaft (2), while the selection motion is kinematically disengaged from the shifting motion and the shifting shaft (2) does not rotate during the selection motion.

12 Claims, 3 Drawing Sheets

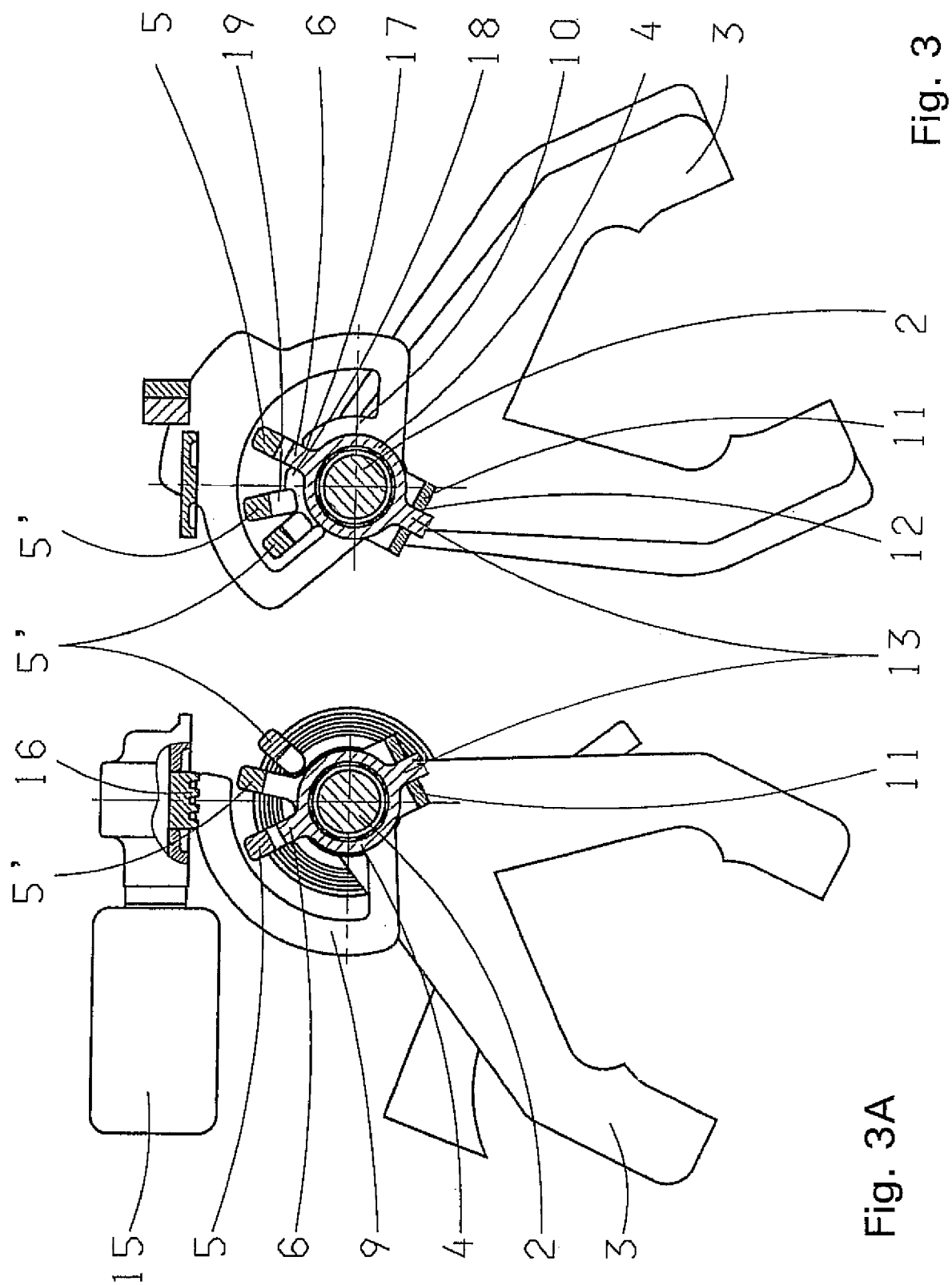

SHIFTING DEVICE FOR A TRANSMISSION

This application is a national stage completion of PCT/EP2005/012915 filed Dec. 2, 2005, which claims priority from German Application Ser. No. 10 2005 001 551.4 filed Jan. 13, 2005.

FIELD OF THE INVENTION

The invention concerns a shifting device for a variable speed transmission.

BACKGROUND OF THE INVENTION

Shifting devices for this kind of transmission are known from the state of the art. DE 199 01 055 A1 of the Applicant discloses a shifting mechanism, for shifting a variable speed transmission, with a shifting shaft that can move essentially parallel to the wheel axle and is arranged in a transmission housing, on which coupling devices are arranged, which establish a connection between the shifting shaft and the shifting forks or selector forks of the gears to be engaged. Locking means are also provided, which lock the shifting forks or selector forks of the gears that are not engaged. A further single rod shifting device is known from DE 199 51 683 A1 of the Applicant.

It also known from the state of the art to automate the shifting procedures in transmissions such as these, such that motion of the gearshift lever is not manual, but is carried out by actuators. A shifting actuator is usually utilized for all paths in combination with a selection actuator. The shifting shaft is herein rotated by way of the selection actuator for selecting the path and is axially displaced, via the shifting actuator, for changing gears.

A known shifting device is configured as a single rail gearshift mechanism, where the axial motion of the shifting shaft, for changing gears, is carried out by way of a suspended piston rod, and the selection cylinder for selecting the path is arranged transversely to the rotary motion of the shifting shaft for the selection of the path. Synchronization of the shifting forks is furthermore carried out by way of brackets and ball pins. A lock guide is also provided on the shift fingers.

The transmissions of utility vehicles frequently have twelve, sixteen or more gears. These multiple gear transmissions are generally configured as multi-group transmissions, which are divided into a front-mounted group, a main group or a main transmission, and a range group. In order to facilitate the complex shifting procedure resulting from the multitude of gears, the majority of these transmissions have an automated shifting device. The gear changes can be carried out pneumatically in the front-mounted group and in the range group, while the gear changes are carried out manually in the main transmission by the driver of the vehicle or automatically by way of suitable electrohydraulic, electropneumatic or electromotorical adjusting devices or a combination of these actuators.

It is known from the state of the art to design the main transmission in such a way that only two paths are required for selecting the gears. This means that only one shifting actuator for the high force demands in utility vehicles must be used, since the second path for gear selection can be operated by way of the same shifting actuator.

It is an object of this invention to disclose an automated shifting device for a transmission, in which the costs and the required installation space are reduced. The force and path demands on the actuators should also be considerably reduced.

SUMMARY OF THE INVENTION

A shifting device, for a manual transmission, designed as a single rail gearshift mechanism with a selection and a shifting actuator is proposed, which comprises a shifting shaft with shifting forks or selector forks, which communicate with sliding collars for engaging the gears, while the shifting motion can be carried out by way of an axial motion of the shifting shaft. The selection motion is kinematically disengaged from the shifting motion. The shifting shaft rotates herein during the selection motion.

The selection mechanics include a driving collar or shifting finger ring for the shifting fork arms, which rotate freely on the shifting shaft and are axially fixed on the shifting shaft, a shifting finger, which engages with corresponding grooves of the shifting fork arms and a locking part, that can be radially driven by selection actuators, is axially immovably fixed on the housing, and transfers the selection motion to the driving collar or shifting finger ring and locks the shifting forks or selector forks of the gears that are not to be engaged.

Within the scope of a preferred embodiment of the invention, the locking part comprises two rings, through which the shifting shaft is guided, which are connected in a rotationally fixed manner by way of a carrier that runs approximately parallel to the longitudinal axis of the shifting shaft. The carrier has a longitudinal groove, in which a finger of the shifting finger ring is without play and axially movably arranged in the direction of rotation. The length of the longitudinal groove is selected such that the shifting motion that can be achieved by way of the axial shifting shaft and thus of the shifting finger ring, can be carried out.

In addition, one ring of the locking part has an element that is positively connected with the selection actuator in such a way that rotary motion of the locking part, around the shifting shaft and thus the shifting finger ring around the shifting shaft, is made possible. The other ring is designed to have a groove in the same position in the direction of rotation as the shifting finger of the shifting finger ring, through which the shifting fork arm can be guided by way of the corresponding shifting motion, while motion of the other shifting fork arm is prevented by way of sheet metal segments of the ring, which engage in grooves of the shifting fork arms.

By way of the concept according to the invention, the transversal forces occurring during the gear change are advantageously neutralized, considerably reducing the force level required for changing gears and thus making the use of an electromagnetic or electrodynamic selection actuator possible. In addition, the path required for the gear change is reduced. Malfunctions of the selection procedure are prevented by providing locking or path blocking. The selection actuator can also be configured by way of a pneumatic or hydraulic cylinder or a cylinder activated by way of an electric motor, where the use of an electromagnetic or electrodynamic actuator is particularly space saving and economic. The axial motion of the shifting shaft can be achieved, via an integrated piston, according to the invention.

When the transmission has four gears or two paths, as can be the case, for example, in a main transmission of a multi-group transmission, the electromagnetically or electrodynamically operable selection actuator can have a particularly simple design and two positions, which produce a further considerable cost reduction, particularly in connection with the use of an electromagnetic or electrodynamic actuator.

According to the invention, the electromagnetic selection actuator can also perform linear, as well as rotary motion, preferably as a simple lifting magnet, reverse lifting magnet or double lifting magnet.

According to the invention, the electrodynamic selection actuator can be perform linear, as well as rotary motion, preferably as a bi-stable shifting magnet, voice coil actuator or moving magnet.

BRIEF DESCRIPTION OF THE DRAWINGS

The invention will now be described, by way of example, with reference to the accompanying drawings in which:

FIG. 3 shows a further schematic sectional view of a preferred embodiment of the shifting device according to the invention; and FIG. 3A shows another schematic sectional view of the preferred embodiment of the shifting device according to FIG. 3.

DETAILED DESCRIPTION OF THE INVENTION

Figure 1:
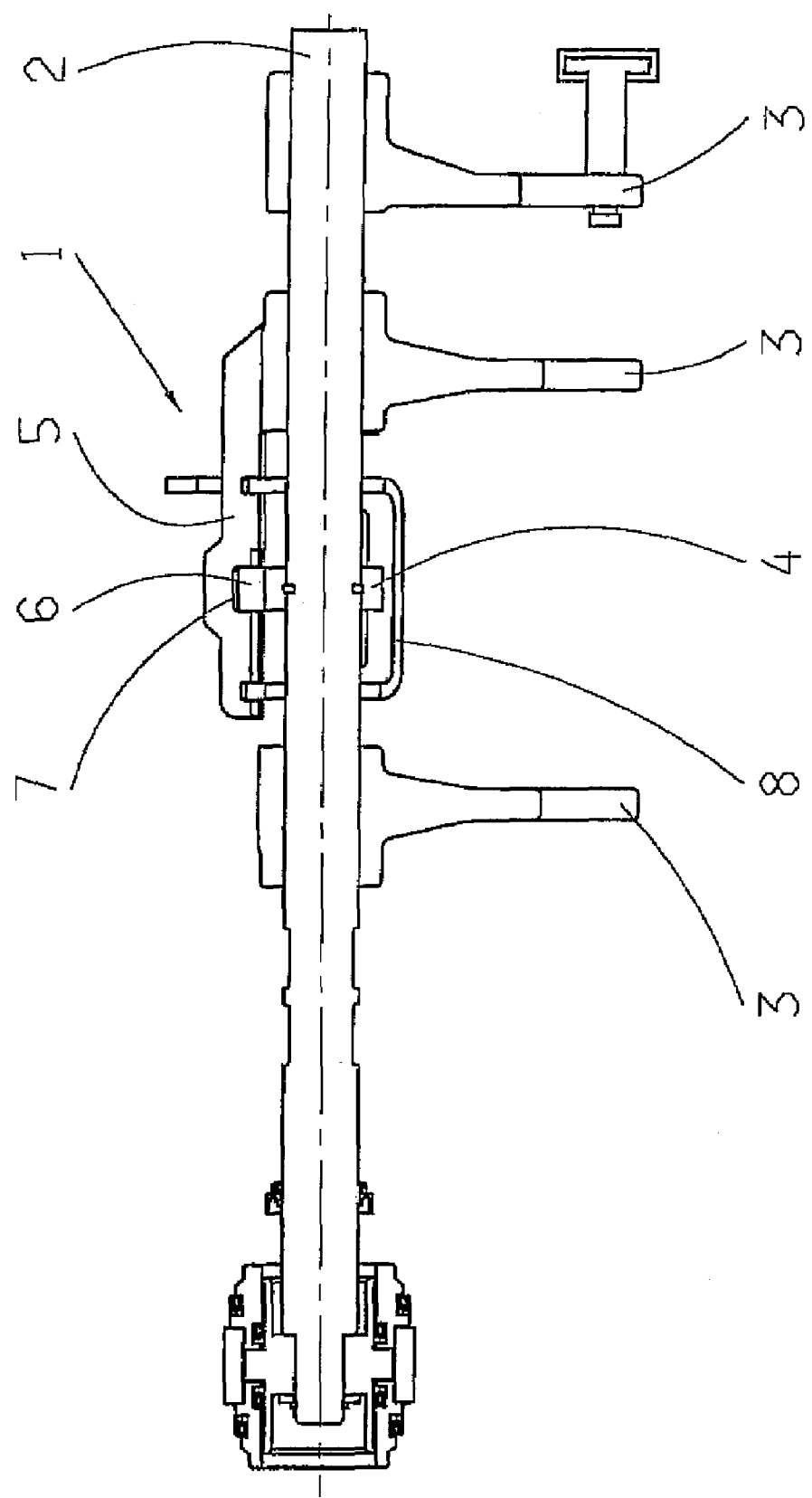
FIG. 1 shows a schematic sectional view of a preferred embodiment of the shifting device according to the invention.

According to FIG. 1, a shifting device 1, according to the invention, comprises a shifting shaft 2, which comprises shifting forks or selector forks 3 that engage sliding collars in order to engage the gears. According to the invention, the shifting device 1 is configured in such a way that selection motion is kinematically decoupled from shifting motion. The shifting motion is carried out by way of an axial motion of the shifting shaft 2 and a selection motion by way of a rotary motion, while the shifting shaft 2 does not participate.

The selection mechanics comprise a driving collar or shifting finger ring 4 for a shifting fork arms 5, which rotate freely on the shifting shaft 2 and are axially fixed on the shifting shaft, a shifting finger 6, which engages corresponding grooves 7 of the shifting fork arms 5, and can be preferably configured as a snap ring.

The selection mechanics, likewise, comprise a locking part 8 that can be radially driven by a selection actuator 15 and is axially immovably fixed on the housing, which transfers the selection motion to the driving collar or shifting finger ring 4 and locks the shifting forks or selector forks 3 of the gears that are not to be engaged.

Figures 2, 2A:
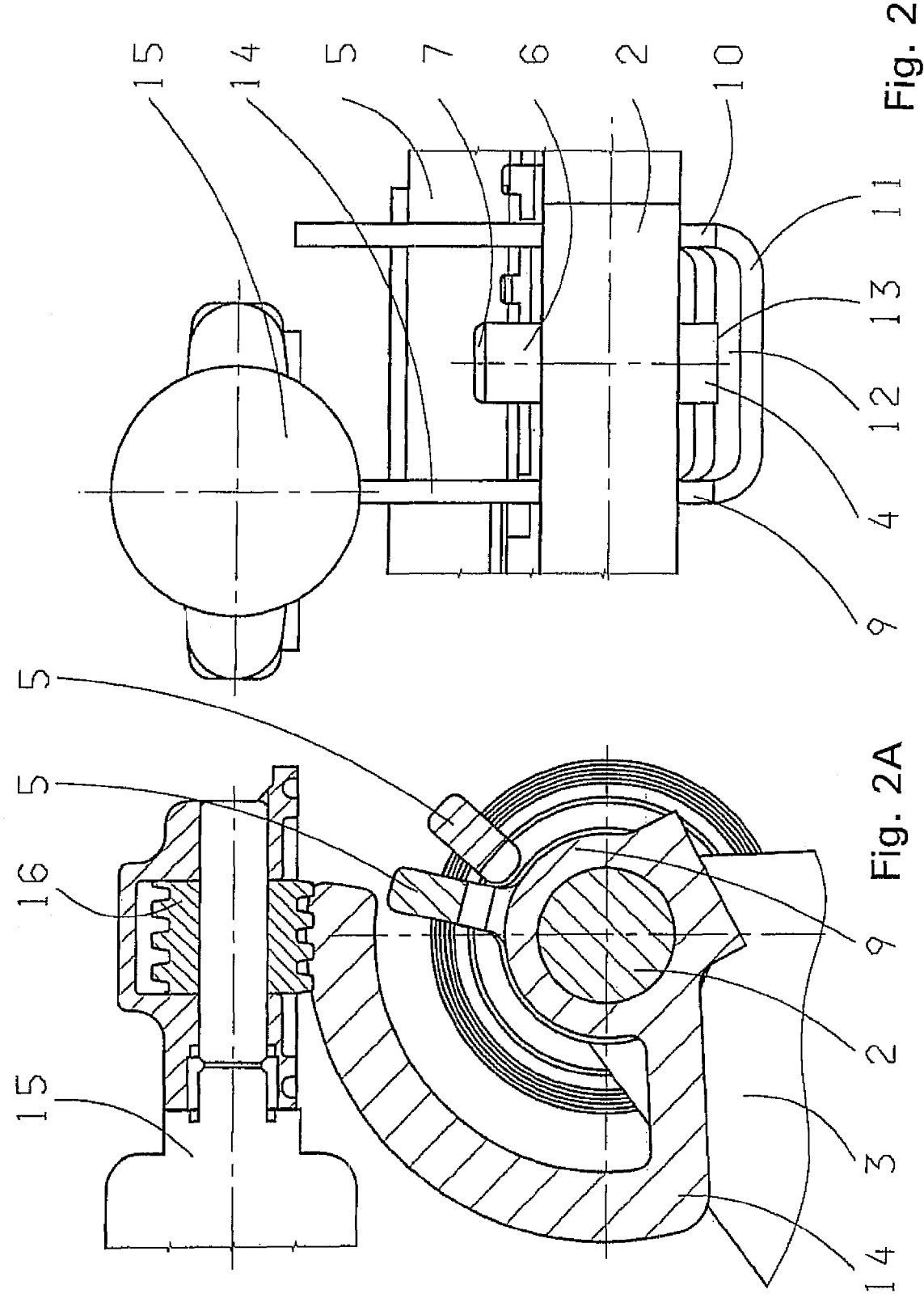
FIG. 2 shows a further schematic sectional view of a preferred embodiment of the shifting device according to the invention.
FIG. 2A shows another schematic sectional view of the preferred embodiment of the shifting device according to FIG. 2.

A preferred embodiment of the locking part is shown in the right part of FIG. 2. The locking part 8 comprises two rings 9, 10, through which the shifting shaft 2 is guided and connected in a rotationally fixed manner by way of a carrier 11 that run approximately parallel to the longitudinal axis of the shifting shaft 2. The driving collar or shifting finger ring 4 is arranged between the two rings 9, 10. The carrier 11 has a longitudinal groove 12, in which a finger 13 of the shifting finger ring 4 is axially movably arranged without play in the direction of rotation. The length of the longitudinal groove is selected in such a way that shifting motion, first, can be achieved by way of the axial motion of the shifting shaft 2 and thus the entrained driving collar or shifting finger ring 4, which engages in a groove of the shifting fork arm 5 of the gear to be engaged and, second, can be carried out after the selection motion.

The one ring 9 of the locking part 8 also has a preferably arch-shaped element 141 which is in positive connection with the selection actuator 15, for example, via a worm drive 16, such that rotary motion of the locking part 8, around the shifting shaft 2 and thus of the shifting finger ring 4 on the shifting shaft 2, is made possible. A deflection lever can be optionally provided, between the selection actuator and the element 14. A lateral view of the element 14 is represented in the left part of FIG. 2, as well as in the left part of FIG. 3. The worm drive 16 can be replaced by way of a simply designed element, which can assume two positions, depending upon the configuration of the shifting device, when only two paths are provided.

The other ring 10 of the locking part 8, of which a lateral view is shown in the right part of FIG. 3, is configured in such a way that it has a groove 17 in the same position in the direction of rotation as the shifting finger 6 of the driving collar or shifting finger ring 4 through which the respectively selected shifting fork arm 5 can be guided during the shifting motion, while a motion of the other shifting fork arms 5' is locked by way of sheet metal segments 18 of the ring 10, which engage in grooves 19 of the shifting fork arms 5'.

The locking part 8 can be configured as one piece, according to the invention, and can be bent after production in order to receive the shown U-shape. Within the scope of further embodiments (not shown), the part of the locking part, that is in positive connection with the selector drive, can have another shape than those shown, depending on the motion transfer.

Transmissions, especially main transmissions of multi-group transmissions, can be advantageously automated by way of the shifting device according to the invention, in such a way that the selection motion in the transmission can be mechanically carried out independently from the selection motion of the gearshift lever actuated by the driver.

In a few manual group transmissions, according to the state of the art, in which a rigid connection between the gearshift lever and shifting shaft is provided, the driver is presented with an uncommon shifting pattern, which does not allow a fluid shifting motion and can lead to erroneous gear changes. A shifting pattern that is familiar can be made available to the driver by using the shifting device according to the invention. A shifting direction inversion in the transmission, which can be realized by way of a swinging fork, is required during the gearshift of the rear-mounted group.

Any other constructive configurations, especially any spatial arrangement of the components of the shifting device, according to the invention, as well as also a combination of these, as long as it is technically practical, of course, is comprised under the scope of the protection of the patent claims, without influencing the operation of the shifting device as it is disclosed in the claims, even if this configuration is not explicitly shown in the Figures or described in the specification.

REFERENCE NUMERALS 1 shifting device
2 shifting shaft
3 shifting fork, selector fork
4 driving collar or shifting finger ring
5 shifting fork arm
5' shifting fork arm
6 shifting finger
7 groove
8 locking part
9 ring
10 ring
11 carrier
12 longitudinal groove
13 finger 14 arch-shaped element
15 selection actuator
16 worm drive
17 groove
18 metal sheet segment
19 groove

The invention claimed is:

1. A shifting device (1), for a transmission with a selection actuator and a shifting actuator, which comprises a shifting shaft (2) and plurality of one of shifting forks (3) and selector forks that engage sliding collars for engaging gears of the transmission, and a shifting motion of the shifting device (1) occurs by axial motion of the shifting shaft (2) and a selection motion is kinematically decoupled from the shifting motion, while the shifting shaft (2) does not rotate during the selection motion, selection mechanics of the shifting device (1) including one of a driving collar and a shifting finger ring (4) for shifting fork arms (5), wherein one of the driving collar and the shifting finger ring (4) rotate freely and are axially fixed on the shifting shaft (2) and comprises a shifting finger (6) that engages in corresponding grooves (7) of the shifting fork arms (5), and a locking part (8) which is axially immovably fixed on a housing while being radially drivable in a rotational direction by the selection actuator (15) and, the locking part (8) transfers the selection motion to one of the driving collar and the shifting finger ring (4) and locks one of the shifting forks (3) and the selector forks of the gears not to be engaged.

2. The shifting device (1) for a transmission of claim 1, wherein the locking part (8) comprises two rings (9, 10) through which the shifting shaft (2) is guided, and the two rings (9, 10) are connected in a rotationally fixed manner via a carrier (11) that runs approximately parallel to a longitudinal axis of the shifting shaft (2) and between which the one of the driving collar and the shifting finger ring (4) is arranged; the carrier (11) has a longitudinal groove (12) in which a finger (13) of the shifting finger ring (4) is axially movably arranged without play in a rotational direction; and a length of the longitudinal groove (12) is such that the shifting motion, achieved via the axial motion of the shifting shaft (2) and thus one of the entrained driving collar and the shifting finger ring (4), which engages a groove of the shifting fork arm (5) of a gear to be engaged, is carried out after the selection motion.

3. The shifting device (1) for a transmission of claim 2, wherein a second ring (10) of the locking part (8) has a groove (17) in a same position in a rotational direction as the shifting finger (6) of one of the driving collar and the shifting finger ring (4), through which the respectively selected shifting fork arm (5) is guided during the shifting motion, while motion of the non-selected shifting fork arms (5') is prevented by segments (18) of the ring (10), which engage grooves (19) of the non-selected shifting fork arms (5').

4. The shifting device (1) for a transmission of claim 2, wherein a first ring (9) of the locking part (8) has an element (14) which is positively connected with the selection actuator (15) such that rotary motion of the locking part (8), and thus the shifting finger ring (4) on the shifting shaft (2) is provided for a gear change.

5. The shifting device (1) for a transmission of claim 4, wherein a deflection lever is located between the selection actuator (15) and the element (14).

6. The shifting device (1) for a transmission of claim 4, wherein the element (14) is an arch-shaped element which is connected to the selection actuator (15) via a worm drive (16).

7. The shifting device (1) for a transmission of claim 1, wherein the selection actuator (15) is one of pneumatically, hydraulically, electromotorically, electromagnetically and electrodynamically operated.

8. The shifting device (1) for a transmission of claim 1, wherein, when two paths are provided for a gear change, the selection actuator (15) assumes only two positions.

9. The shifting device (1) for a transmission of claim 8, wherein the selection actuator (15) is one of an electromagnetically operable actuator and an electrodynamically operable actuator (15).

10. The shifting device (1) for a transmission of claim 8, wherein when the selection actuator (15) is lineally and rotationally operated electromagnetically operable actuator (15), and the selection actuator (15) is one of a simple lifting magnet, a reverse lifting magnet, and a double lifting magnet.

11. The shifting device (1) for a transmission of claim 1, wherein when the selection actuator (15) is lineally and rotationally operated, the selection actuator (15) is one of a bistable shifting magnet, a voice coil actuator and a moving magnet.

12. A shifting device (1) for a main transmission of a multispeed transmission with a selection actuator and a shifting actuator, the shifting device (1) comprising a shifting shaft (2) with a plurality of one of shifting forks and selector forks (3) that engage sliding collars for engaging gears of the transmission, a shifting motion of the transmission being carried out by axial motion of the shifting shaft (2) and a selection motion is kinematically decoupled from the shifting motion, while the shifting shaft (2) does not rotate during the selection motion, selection mechanics of the shifting device (1) includes one of a driving collar and a shifting finger ring (4) for shifting fork arms (5), wherein one of the driving collar and the shifting finger ring (4) rotate freely and are axially fixed on the shifting shaft (2) and comprises a shifting finger (6) that engages in corresponding groove (7) of the shifting fork arm (5), and a locking part (8) that is radially driven in a rotational direction by the selection actuator (15) and is axially immovably fixed on a housing, the locking part transfers the selection motion to one of the driving collar and the shifting finger ring (4) and locks one of the shifting forks (3) and the selector forks of the gears not to be engaged, the selection motion is mechanically carried out independently of the selection motion of a gearshift lever actuated by a driver such that a familiar shifting pattern is presented to the driver.

* * * * *